US011411886B1

(12) United States Patent
Bhandari et al.

(10) Patent No.: US 11,411,886 B1
(45) Date of Patent: Aug. 9, 2022

(54) AUTOMATIC CLUSTER SCALING BASED ON VARYING WORKLOADS

(71) Applicant: International Business Machines Corporation, Armonk, NY (US)

(72) Inventors: Sujit Bhandari, Fredericton (CA); Panos Patros, Hamilton (NZ); Maria Patrou, Fredericton (CA); Kenneth Blair Kent, Fredericton (CA); Michael Dawson, Ottawa (CA); Joran S. C. Siu, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/444,968

(22) Filed: Aug. 12, 2021

(51) Int. Cl.
*H04L 12/911* (2013.01)
*H04L 12/927* (2013.01)
*G06F 15/173* (2006.01)
*H04L 47/80* (2022.01)
*H04L 47/78* (2022.01)
*H04L 47/762* (2022.01)

(52) U.S. Cl.
CPC .......... *H04L 47/805* (2013.01); *H04L 47/762* (2013.01); *H04L 47/781* (2013.01); *H04L 47/803* (2013.01)

(58) Field of Classification Search
CPC ... H04L 47/805; H04L 47/762; H04L 47/781; H04L 47/788; H04L 47/803; H04L 47/801
USPC ......................................................... 709/226
See application file for complete search history.

(56) References Cited

U.S. PATENT DOCUMENTS

| 2011/0096074 | A1* | 4/2011 | Agarwal ................. H04L 67/00 709/224 |
| 2017/0214634 | A1 | 7/2017 | Li |
| 2018/0349168 | A1* | 12/2018 | Ahmed ............... G06F 11/3433 |
| 2020/0042364 | A1* | 2/2020 | Kumar Shimoga Manjunatha ..... G06F 9/5072 |
| 2020/0142758 | A1 | 5/2020 | Norris et al. |
| 2020/0153898 | A1* | 5/2020 | Sabath ....................... G06F 8/65 |
| 2020/0241903 | A1* | 7/2020 | Wang ...................... G06F 9/547 |
| 2020/0319935 | A1 | 10/2020 | Srivastava et al. |

(Continued)

OTHER PUBLICATIONS

Barna et al., "Cloud Adaptation with Control Theory in Industrial Cloud," IEEE International Conference on Cloud Engineering Workshops, 2016, 8 pages.

(Continued)

*Primary Examiner* — Ruolei Zong
(74) *Attorney, Agent, or Firm* — Yee & Associates, P.C.

(57) ABSTRACT

A method manages a cluster. A computer system determines a measurement of a process variable for the cluster, wherein the process variable indicates a quality of service for the cluster. The computer system determines a comparison between the measurement of the process variable and a desired value for the process variable. The computer system determines an adjustment to a setpoint for a runtime metric in the cluster based on the comparison, wherein the runtime metric is a control variable for the cluster. The computer system updates the setpoint for the runtime metric in a controller for the cluster using the adjustment, wherein the runtime metric is used by the controller as the control variable to scale a set of resources in the cluster to cause a value of the runtime metric to move towards the setpoint.

18 Claims, 8 Drawing Sheets

(56) References Cited

U.S. PATENT DOCUMENTS

| | | | |
|---|---|---|---|
| 2021/0117217 A1* | 4/2021 | Croteau | G06F 11/302 |
| 2021/0377184 A1* | 12/2021 | Singh | H04L 47/781 |
| 2022/0004417 A1* | 1/2022 | Sinha | G06F 9/45558 |

OTHER PUBLICATIONS

Dickel et al., "Evaluation of Autoscaling Metrics for (stateful) IoT Gateways," IEEE 12th Conference on Service-Oriented Computing and Applications (SOCA), 2019, 8 pages.

Dickel, "Control-theoretic Approach to Horizontal Auto scaling of Services Orchestrated by Kubernetes," Mater's Thesis, Dept. of Informatics, Technical Univ. of Munich, 2020, 82 pages.

Klein et al., "Brownout: Building More Robust Cloud Applications," Proceedings of the 36th International Conference on Software Engineering—ICSE, 2014, 12 pages.

Maggio et al., "Control Strategies for Predictable Brownouts in Cloud Computing," IFAC Proceedings Volumes, vol. 47, 2014, 6 pages.

Patros et al., "SLO Request Modeling, Reordering and Scaling," Proceeding of the 27th Annual International Conference on Computer Science and Software Engineering, 2017, 12 pages.

Patrou et al.,"Software Evaluation Methodology of Node.js Parallelism under Variabilities in Scalable Systems," Proceedings of the 30th Annual International Conference on Computer Science and Software Engineering, 2020, 10 pages.

Podolskiy et al.,"Maintaining SLOs of Cloud-native Applications via Self-Adaptive Resource Sharing." IEEE 13th International Conference on Self-Adaptive and Self Organizing Systems (SASO), 2019, 10 pages.

Song et al., "An Auto Scaling System for API Gateway Based on Kubernetes." IEEE 9th International Conference on Software Engineering and Service Science (ICSESS), 2018, 4 pages.

Ye et al., "An Auto-scaling Framework for Containerized Elastic Applications," 3rd International Conference on Big Data Computing and Communications, 2017, 9 pages.

Zhu et al., "Node.js scalability investigation in the cloud," Proceeding of the 28th Annual International Conference on Computer Science and Software Engineering, 2018, 12 pages.

Zhu, "A Scalability-oriented Benchmark Suite for Node.js in the Cloud," Master's Thesis, The University of New Brunswick, Aug. 2018, 153 pages.

Gama et al., "Learning with Drift Detection," Academia, Advances in Artificial Intelligence, 2004, 11 pages.

Ljung, "Experiments with Identification of Continuous Time Models," Proceedings of the 15th IFAC Symposium on System Identification, 2009, 6 pages.

* cited by examiner

AUTOMATIC CLUSTER SCALING BASED ON VARYING WORKLOADS

BACKGROUND

1. Field

The disclosure relates generally to an improved computer system and more specifically to a method, apparatus, computer system, and computer program product for automatically scaling groupings of containers running workloads.

2. Description of the Related Art

A microservices architecture is an approach in which an application is comprised of independent, loosely coupled, and individually deployable services. With microservices, the use of operating system level virtualization to run services has increased. Each service can be deployed as a container. In providing services to clients, service level agreements (SLAs) are often in place that define different aspects of the service that clients can expect from the provider of the service. For example, service level agreements may define quantity, availability, and responsibilities. For example, a service level agreement can include service level objectives (SLOs), which are a means of measuring the performance for service level agreement. A service level objective may be a response time that can be expected when sending request to a service.

For example, the service level objective may specify a 95 percentile response time for a specific period of time. In meeting the service level objective, instances of a service can be scaled to reduce response times for requests to meet the service level objective. With services deployed in containers, these containers are located in a pod and one or more pods can run on nodes in a cluster. These pods in a cluster can be automatically scaled to provide scaling for the service to meet a service level objective such as maximum response time.

This type of scaling can be performed can to meet service level objectives. One manner in which scaling can be performed involves scaling the number of computing instances based on varying load conditions.

SUMMARY

According to one illustrative embodiment, a computer implemented method for managing a cluster is provided. A computer system determines a measurement of a process variable for the cluster, wherein the process variable indicates a quality of service for the cluster. The computer system determines a comparison between the measurement of the process variable and a desired value for the process variable. The computer system determines an adjustment to a setpoint for a runtime metric in the cluster based on the comparison, wherein the runtime metric is a control variable for the cluster. The computer system updates the setpoint for the runtime metric in a controller for the cluster using the adjustment, wherein the runtime metric is used by the controller as the control variable to scale a set of resources in the cluster to cause a value of the runtime metric to move towards the setpoint. According to other illustrative embodiments, a computer system and a computer program product for managing a cluster are provided.

DETAILED DESCRIPTION

Figure 1:
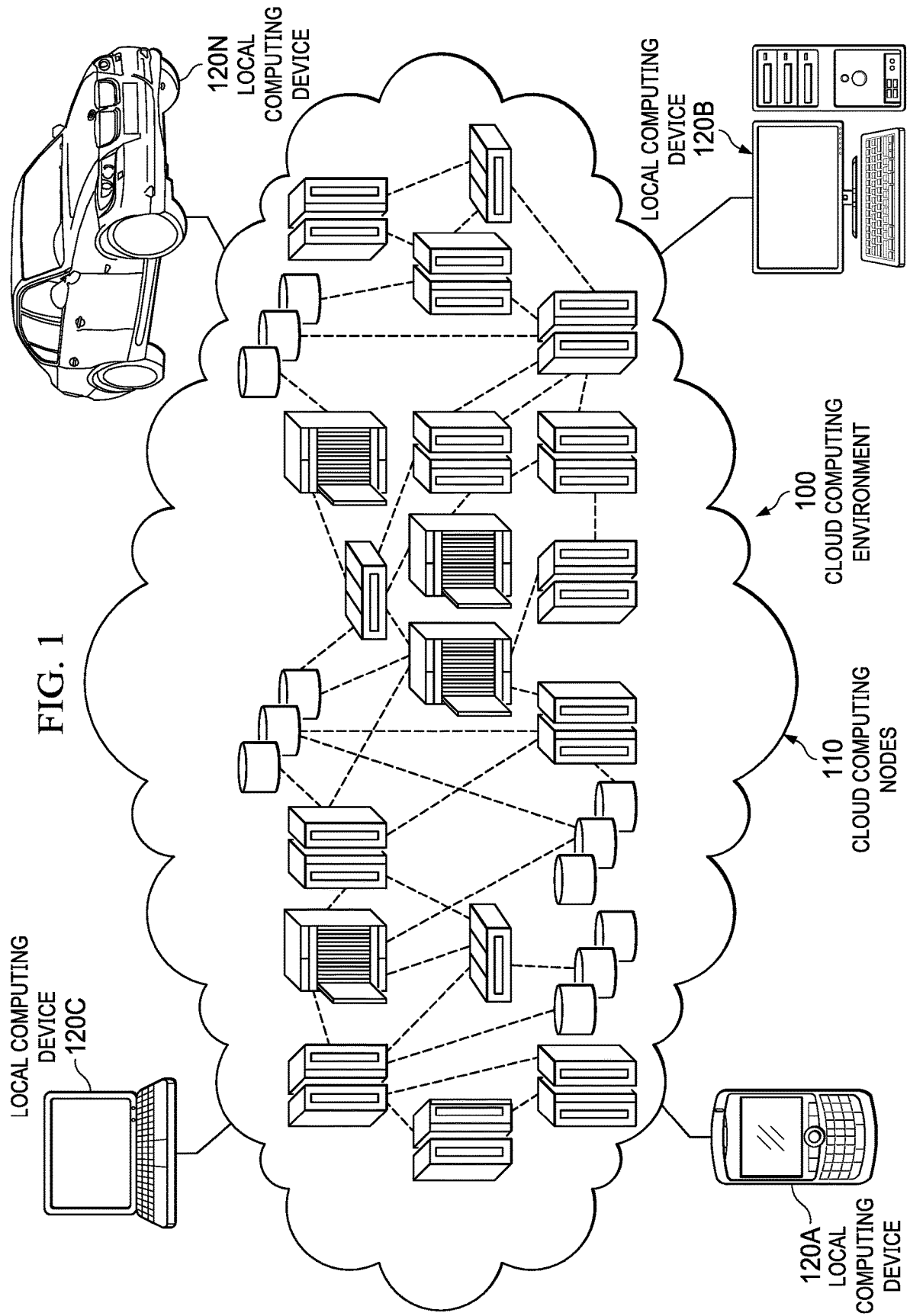
FIG. 1 is a diagram illustrating a cloud computing environment in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that current techniques for scaling resources take into account that current techniques look at resource usage such as CPUs utilization, memory use, or other resource metrics. The illustrative embodiments recognize and take account that scaling resources based on these metrics not always provide a desired result such as needing service level objectives such as response time.

For example, the illustrative embodiments recognize and take into account that managing resources to provide containerized services with code written using event driven platforms such as Node.js, can be difficult. The illustrative embodiments recognize and take into account that a processor or memory based resource auto-scaling mechanism may not yield the best possible response time nor resource utilization. The illustrative embodiments recognize and take into account over provisioning or under provisioning of resources can occur.

The illustrative embodiments recognize and take account that other types of metrics can be valuable in meeting a service level objective. For example, the illustrative embodiments recognize and take account that scaling resources such as pods in a cluster using a metric for processes running in containers in pods can be more useful than current metrics. For example, runtime metrics such as those metrics that are internal container metrics based on processes running the container can be useful in meeting a service level objective.

In one illustrative example, the runtime metric can be event loop lag that describes the delay in an event loop used in Node.js. Node.js is an open-source cross platform, back-end JavaScript environment that can be used to write code for a container running in a container orchestration platform such as Kubernetes. JavaScript is a trademark of the Oracle Corporation. Although an illustrative example is described using runtime metrics internal to Node.js, these examples are not meant to limit the other illustrative examples to this particular environment. Other illustrative examples can be used in other environments for containers that have other types of runtime metrics that are internal to those environments. In other words, the illustrative examples can be used with environments in which metrics are present for running containers that lack components in the operating system. For example, other illustrative examples can be implemented using Common Language Runtime (CLR) in C#, Java Virtual Machine (JVM), and other suitable platforms.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference now to FIG. 1, a diagram illustrating a cloud computing environment is depicted in which illustrative embodiments may be implemented. In this illustrative example, cloud computing environment 100 includes a set of one or more cloud computing nodes 110 with which local computing devices used by cloud consumers, such as, for example, personal digital assistant or smart phone 120A, desktop computer 120B, laptop computer 120C, and/or automobile computer system 120N, may communicate.

As used herein, "a set of" when used with reference to items, means one or more items. For example, "a set of cloud computing nodes is one or more cloud computing nodes.

Cloud computing nodes 110 may communicate with one another and may be grouped physically or virtually into one or more networks, such as private, community, public, or hybrid clouds as described hereinabove, or a combination thereof. This allows cloud computing environment 100 to offer infrastructure, platforms, and/or software as services for which a cloud consumer does not need to maintain resources on a local computing device, such as local computing devices 120A-120N. It is understood that the types of local computing devices 120A-120N are intended to be illustrative only and that cloud computing nodes 110 and cloud computing environment 100 can communicate with any type of computerized device over any type of network and/or network addressable connection using a web browser, for example.

Figure 2:
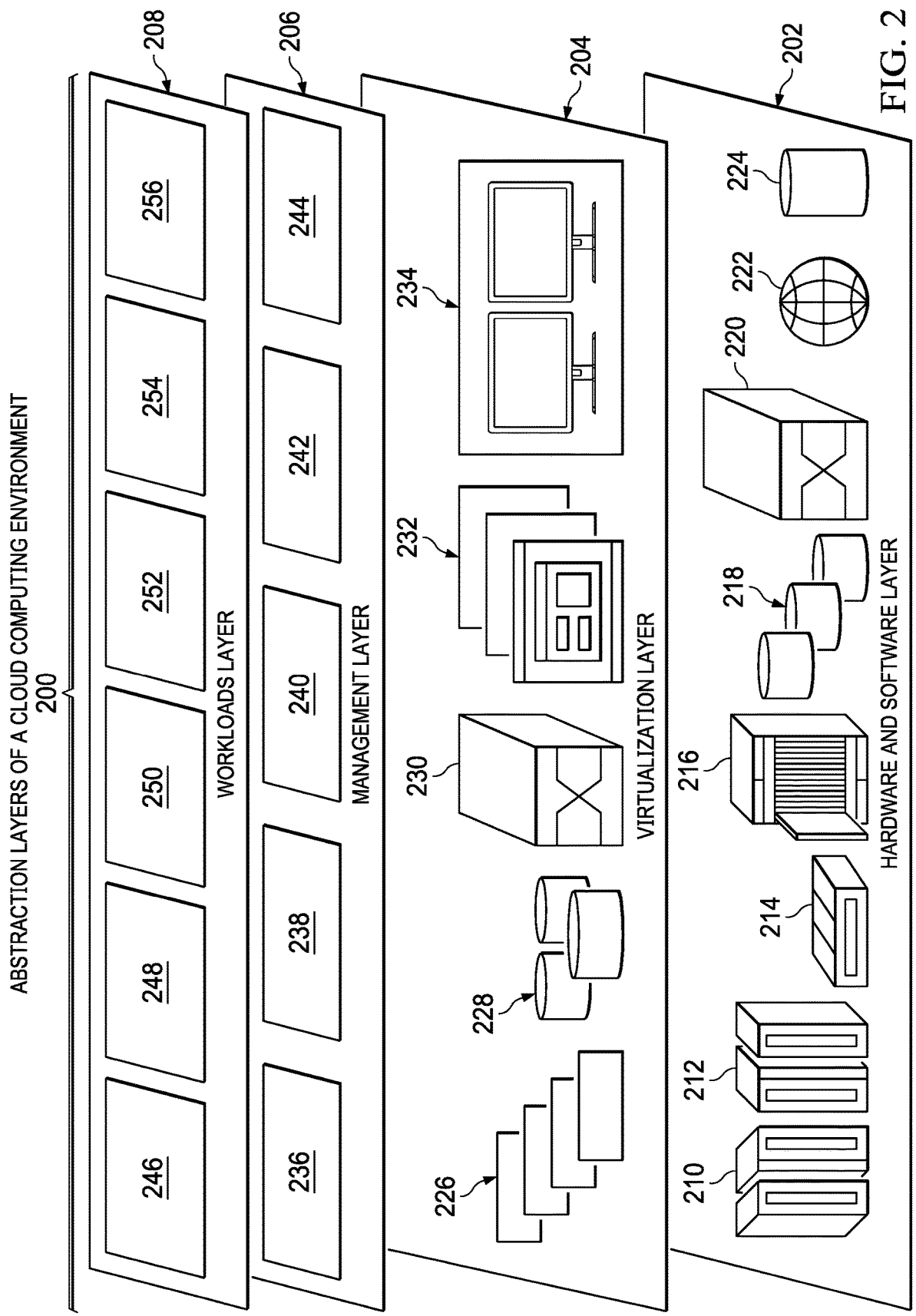
FIG. 2 is a diagram illustrating abstraction model layers in accordance with an illustrative embodiment.

With reference now to FIG. 2, a diagram illustrating abstraction model layers is depicted in accordance with an illustrative embodiment. The set of functional abstraction layers shown in this illustrative example may be provided by a cloud computing environment, such as cloud computing environment 100 in FIG. 1. It should be understood in advance that the components, layers, and functions shown in FIG. 2 are intended to be illustrative only and embodiments of the invention are not limited thereto. As depicted, the following layers and corresponding functions are provided.

Abstraction layers of a cloud computing environment 200 include hardware and software layer 202, virtualization layer 204, management layer 206, and workloads layer 208. Hardware and software layer 202 includes the hardware and software components of the cloud computing environment. The hardware components may include, for example, mainframes 210, RISC (Reduced Instruction Set Computer) architecture-based servers 212, servers 214, blade servers 216, storage devices 218, and networks and networking components 220. In some illustrative embodiments, software components may include, for example, network application server software 222 and database software 224.

Virtualization layer 204 provides an abstraction layer from which the following examples of virtual entities may be provided: virtual servers 226; virtual storage 228; virtual networks 230, including virtual private networks; virtual applications and operating systems 232; and virtual clients 234.

In one example, management layer 206 may provide the functions described below. Resource provisioning 236 provides dynamic procurement of computing resources and other resources, which are utilized to perform tasks within the cloud computing environment. Metering and pricing 238 provide cost tracking as resources that are utilized within the cloud computing environment, and billing or invoicing for consumption of these resources. In one example, these resources may comprise application software licenses. Security provides identity verification for cloud consumers and tasks, as well as protection for data and other resources. User portal 240 provides access to the cloud computing environment for consumers and system administrators. Service level management 242 provides cloud computing resource allocation and management such that required service levels are met. Service level agreement (SLA) planning and fulfillment 244 provides pre-arrangement for, and procurement of, cloud computing resources for which a future requirement is anticipated in accordance with an SLA.

Workloads layer 208 provides examples of functionality for which the cloud computing environment may be utilized. Example workloads and functions, which may be provided by workload layer 208, may include mapping and navigation 246, software development and lifecycle management 248, virtual classroom education delivery 250, data analytics processing 252, transaction processing 254, and cluster manager 256.

In this example, cluster manager 256 can operate to deploy and mange clusters. These clusters can be groupings of nodes such as cloud computing nodes 110. Pods containing containers for services can be located in clusters. These services can be micro services for applications. One or more illustrative examples, can be implemented in cluster manager 256 to provide a desired level of service provided by the services.

Figure 3:
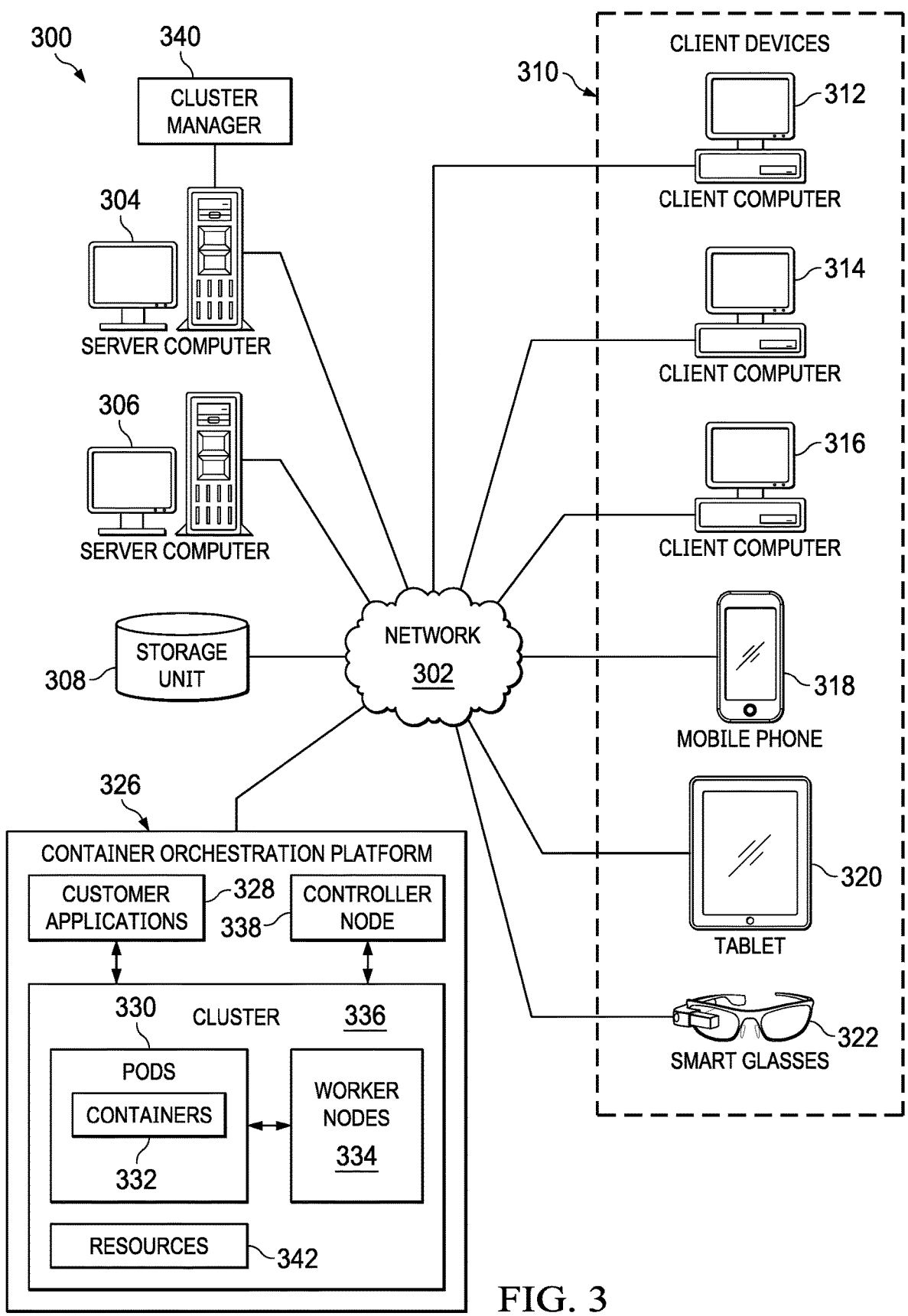
FIG. 3 is a pictorial representation of a network of data processing systems in which illustrative embodiments may be implemented.

With reference now to FIG. 3, a pictorial representation of a network of data processing systems is depicted in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server computer 304 and server computer 306 connect to network 302 along with storage unit 308. In addition, client devices 310 connect to network 302. As depicted, client devices 310 include client computer 312, client computer 314, and client computer 316. Client devices 310 can be, for example, computers, workstations, or network computers. In the depicted example, server computer 304 provides information, such as boot files, operating system images, and applications to client devices 310. Further, client devices 310 can also include other types of client devices such as mobile phone 318, tablet computer 320, and smart glasses 322. In this illustrative example, server computer 304, server computer 306, storage unit 308, and client devices 310 are network devices that connect to network 302 in which network 302 is the communications media for these network devices. Some or all of client devices 310 may form an Internet-of-things (IoT) in which these physical devices can connect to network 302 and exchange information with each other over network 302.

Client devices 310 are clients to server computer 304 in this example. Network data processing system 300 may include additional server computers, client computers, and other devices not shown. Client devices 310 connect to network 302 utilizing at least one of wires, optical fiber, or wireless connections.

Program code located in network data processing system 300 can be stored on a computer-recordable storage media and downloaded to a data processing system or other device for use. For example, program code can be stored on a computer-recordable storage media on server computer 304 and downloaded to client devices 310 over network 302 for use on client devices 310.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 300 also may be implemented using a number of different types of networks. For example, network 302 can be comprised of at least one of the Internet, an intranet, a local area network (LAN), a metropolitan area network (MAN), or a wide area network (WAN). FIG. 3 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Container orchestration platform 326 can be, for example, a Kubernetes® architecture, environment, or the like. However, it should be understood that description of illustrative examples using Kubernetes is meant as an example architecture only and not as a limitation on illustrative embodiments. Container orchestration platform 326 can also be referred to as a container orchestration system.

Container orchestration platform 326 provides a platform for automating deployment, scaling, and operations of customer applications 328. In this illustrative example, cluster 336 runs in a Kubernetes® architecture, environment, or the like. However, it should be understood that description of illustrative examples using Kubernetes is meant as an example architecture only and not as a limitation on illustrative embodiments.

Container orchestration platform 326 provides a platform for automating deployment, scaling, and operations of customer applications. Container orchestration platform 326 also provides automatic deployment, scaling, and operations of pods 330. Each pod in pods 330 comprises a number of containers 332 running customer application workloads for customer applications 328 across cluster 336 of worker nodes 334.

These worker nodes 334 are also referred to as host nodes or minions. While the term "pod" is generally used in the Kubernetes paradigm, the term as used herein is not limited to that environment but rather refers to any grouping of a number of containers 332 where workloads are deployed and hold the running applications, libraries, and their dependencies.

A container is a standard unit of software for an application that packages up program instructions and all its dependencies, so the application can run on multiple computing environments. A container isolates software from the environment in which the container runs and ensures that the container works uniformly in different environments. A container for an application can share the operating system kernel on a machine with other containers for other applications. As a result, an operating system is not required for each container running on the machine.

Controller node 338 corresponds to cluster of worker nodes 334 that performs customer application workloads. Controller node 338 receives and tracks service requests from client device users requesting performance of services corresponding to customer applications 328. Controller node 338, which is a main controlling unit of cluster 336 of worker nodes 334, manages a customer application for cluster 336 and directs communication across worker nodes 334 in cluster 336. A worker node in worker nodes 334 is a machine, either physical or virtual, where containers for applications are deployed. While the terms "controller node" and "worker node" are generally used in the Kubernetes paradigm, these terms as used herein are not limited to that environment but rather refer to any type of nodes that are capable of controlling and running customer applications 328.

In this illustrative example, cluster manager 340 can be located in server computer 304. Cluster manager 340 can operate to manage cluster 336 in container orchestration platform 326. This management can include allocating resources, such as pods 330, within cluster 336. This allocation can be increasing or decreasing pods 330 running on worker nodes 334 in cluster 336. This change in allocation can also be referred to as a scaling of pods 330.

Cluster manager 340 can monitor a process variable such as a service level indicator. In one illustrative example, the service level indicator (SLI) can be a response time for a service running in a container in containers 332. This response time can be compared to a desired value of the response time to obtain a difference between the two values. The desired value can be based on various sources including a service level objective (SLO).

This difference can be used to determine an adjustment to the set point for a control variable used within cluster 336 to scale resources 342 for cluster 336. A control variable is a variable that is a variable of interest for controlling resource allocation. In this example, the control variable can be selected as a variable that can have a desired effect on the response time.

For example, a control variable can be an event loop lag in a worker node in worker nodes 334. In other words, if the event loop lag is greater than the set point, scaling can be performed to increase the number of pods 330. This increase can reduce the event loop lag measured for cluster 336 to a value that is at or below the setpoint. In this illustrative example, reducing the event loop lag to or below the setpoint can result on a reduction in the response time to a desired level such as that defined in the service level objective. As a result, changing the set point can be used to control the response time to have a desired level meeting the service level objective.

Figure 4:
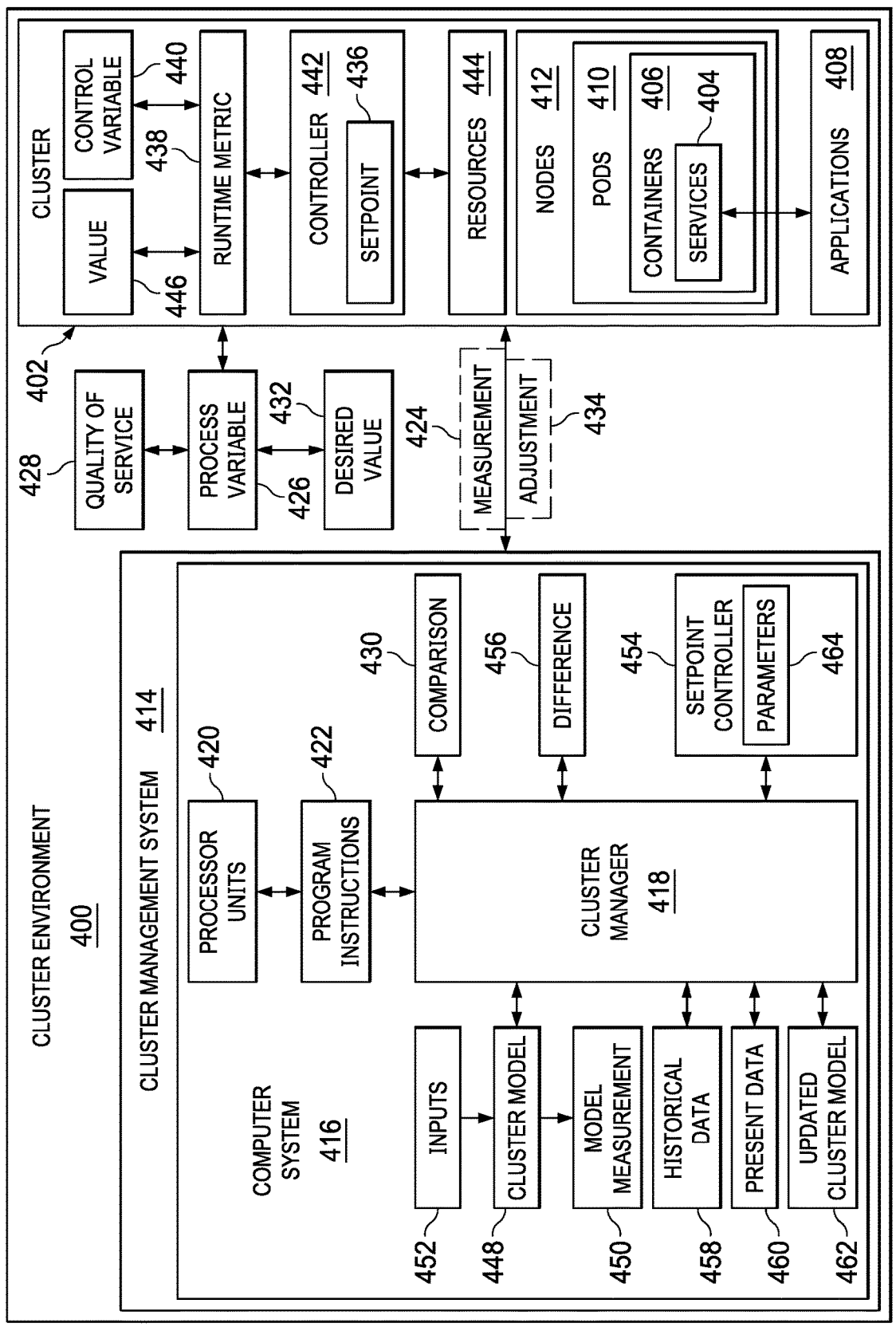
FIG. 4 is a block diagram of a cluster environment in accordance with an illustrative embodiment.

With reference now to FIG. 4, a block diagram of a cluster environment is depicted in accordance with an illustrative embodiment. In this illustrative example, cluster environment 400 includes components that can be implemented in hardware such as the hardware shown in cloud computing environment 100 in FIG. 1 and network data processing system 300 in FIG. 3.

In the illustrative example, cluster environment 400 includes cluster 402 in which a set of services 404 run in a group of containers 406 for a number of applications 408. Each application in the number of applications 408 can have one or more services in services 404. The group of containers 406 run in a group of pods 410 located in a number of nodes 412 in cluster 402.

As used herein, a "group of" when used with reference to items means one or more items. For example, a group of containers 406 is one or more containers.

In this illustrative example, cluster management system 414 operates to manage cluster 402. As depicted, cluster management system 414 comprises computer system 416 and cluster manager 418. Cluster manager 418 is located in computer system 416.

Cluster manager 418 can be implemented in software, hardware, firmware or a combination thereof. When software is used, the operations performed by cluster manager 418 can be implemented in program instructions 422 configured to run on hardware, such as a processor unit. When firmware is used, the operations performed by cluster manager 418 can be implemented in program instructions 422 and stored in persistent memory to run on a processor unit. When hardware is employed, the hardware may include circuits that operate to perform the operations in cluster manager 418.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 416 is a physical hardware system and includes one or more data processing systems. When more than one data processing system is present in computer system 416, those data processing systems are in communication with each other using a communications medium. The communications medium can be a network. The data processing systems can be selected from at least one of a computer, a server computer, a tablet computer, or some other suitable data processing system.

As depicted, computer system 416 includes a number of processor units 420 that are capable of executing program instructions 422 implementing processes in cluster manager 418 when cluster manager 418 includes software. As used herein a processor unit in the number of processor units 420 is a hardware device and is comprised of hardware circuits such as those on an integrated circuit that respond and process instructions and program code that operate a computer. When a number of processor units execute instructions for a process, the number of processors units is one or more processors units that can be on the same computer or on different computers. In other words, the process can be distributed between processors units on the same or different computers in a computer system. Further, the number of processor units can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, cluster manager 418 determines measurement 424 of process variable 426 for cluster 402. In this example, process variable 426 indicates quality of service 428 for cluster 402. Process variable 426 can be, for example, service level indicator, a response time, a latency, an availability, an error rate, a throughput, a durability, and other types of variables that can be used to indicate quality of service 428. In this illustrative example, quality of service 428 can be the service provided by services 404 for a number of applications 408. In this example, measurement 424 is determined by receiving measurement 424 from cluster 402

Cluster manager 418 also determines comparison 430 between measurement 424 of process variable 426 and desired value 432 for process variable 426. In one illustrative example, desired value 432 for process variable 426 can be based on service level agreement (SLA). Cluster manager 418 also determines adjustment 434 to setpoint 436 for runtime metric 438 in cluster 402 based on comparison 430. In this example, runtime metric 438 is used as control variable 440 for cluster 402.

In this illustrative example, cluster manager 418 updates setpoint 436 for runtime metric 438 in controller 442 for the cluster 402 using adjustment 434. Runtime metric 438 can be used by controller 442 as control variable 440 to scale a set of resources 444 in the cluster 402 to cause value 446 of runtime metric 438 to move towards setpoint 436. The set of resources 444 can be selected from at least one of a pod, a container, a persistent volume, a job, a ConfigMap object, or some other resource in cluster 402 that can be scaled to change runtime metric 438 to move towards setpoint 436.

Cluster manager 418 can create cluster model 448 of cluster 402. In this example, cluster model 448 outputs model measurement 450 of process variable 426 in response to inputs 452 to cluster model 448. In this illustrative example, cluster model 448 can take a number of different forms. For example, cluster model 448 can be a sequence of mathematical differential or difference equations. The model structure can include transfer functions with adjustable poles and zeroes, state-space equations and non-linear parameterized functions that capture the mathematical relations between the process variables and control variables. In another example, cluster model 448 can be a black box that reproduces the measured data. In yet another illustrative example, gray box modeling can be used when the structures are known but the model parameters are unknown.

Cluster manager 418 can create setpoint controller 454. As depicted, setpoint controller 454 determines adjustment 434 to setpoint 436 for runtime metric 438 in cluster 402 based on comparison 430. In this example, cluster manager 418 can determine adjustment 434 using setpoint controller 454.

In the illustrative example, setpoint controller 454 can be created in a manner such that setpoint controller 454 can control variable 440 based on measurement 424 of process variable 426. In this illustrative example, adaptation goals such as rise time, overshoot and settling time can be taken into account when creating setpoint controller 454.

In the illustrative example, setpoint controller 454 can be tuned using a number of different techniques. These techniques can include a root locus technique. In another example, heuristic-based methods such as Ziegler-Nichols and Cohen-Coon, which do not require the system's transfer function can be used. As another example, parameters 464 can be derived analytically using cluster model 448 and a closed-loop transfer function with objectives such as pole placement or lambda tuning.

In this illustrative example, setpoint controller 454 can be validated using a closed-loop in which cluster model 448 provides responses that are sent to setpoint controller 454, which in turn determines an adjustment 434 to the setpoint 436 for the control variable 440 in cluster model 448 to determine whether the process variable 426 for a service level objective has a desired value 446.

Additionally, cluster manager 418 can determine difference 456 between historical data 458 for process variable 426 output by cluster model 448 and present data 460 for the cluster 402. In this illustrative, present data 460 are measurements from cluster 402 generated using adjustments generated by setpoint controller 454. Cluster manager 418 can determine whether cluster model 448 has drifted based an analysis of the difference between on historical data 458 and present data 460 for process variable 426 determined for cluster 402. The difference between these values can be analyzed to determine whether cluster model 448 has drifted. In this illustrative example, the determination of draft can be made using a statistical analysis. In the illustrative example, historical data 458 and present data 460 can include other data in addition to values for process variable 426.

In this illustrative example, a hypothesis test can be used to calculate the statistical significance of the difference in the two datasets, historical data 458 and present data 460. For example, an error-rate-based concept drift detection algorithm, such as the Drift Detection Method can be used to determine whether a statistical significance is present in the difference between the two data sets. A landmark time window can be set for drift detection, in which the starting point is the same for both historical data 458 and present data 460, but the ending point expands to cover new data points for present data 460. The Drift Detection Method can be used to estimates cluster model 448, including new data points, within the landmark window and calculates the error rate. This algorithm can estimate the statistical significance of the error rate to indicate model drift for cluster model 448.

Cluster manager 418 can update cluster model 448 in response to a determination that cluster model 448 has drifted to form updated cluster model 462 for cluster 402. With updated cluster model 462, cluster manager 418 can update a set of parameters 464 in setpoint controller 454 using updated cluster model 462. As a result, cluster manager 418 can determine when changes have occurred in cluster 402 such that the current configuration of setpoint controller 454 no longer provides a desired level control in scaling the set of resources 444 in cluster 402.

In one illustrative example, one or more technical solutions are present that overcome a problem with scaling resources in a cluster when scaling resources based on these metrics in a computer system do not always provide a desired result such as needing service level objectives such as response time. As a result, one or more illustrative examples provide setpoint tracking that can occur in which the response time for a cluster can be continuously tracked by a controller such as a PID controller with the response time being a setpoint in a manner that reduces error. Additionally, in one or more illustrative examples, a transient response can occur in which the output does not oscillate in response to a control action changing an event loop lag setpoint and settles just above or below the set point for the response time. Additionally, one or more illustrative examples provides an ability to reduce the effects of imprecision in a model of the cluster, transient errors, and delays on a desired service level objective. Further, one or more illustrative examples can ensure that a cluster is able to maintain a desired response time even under varying or peak load conditions on the cluster.

Computer system 416 can be configured to perform at least one of the steps, operations, or actions described in the different illustrative examples using software, hardware, firmware or a combination thereof. As a result, computer system 416 operates as a special purpose computer system in which cluster manager 418 in computer system 416 enables scaling resources in a cluster. For example, cluster manager 418 transforms computer system 416 into a special purpose computer system as compared to currently available general computer systems that do not have cluster manager 418.

The illustration of cluster environment 400 in FIG. 4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although a single cluster is depicted in cluster environment 400, one or more clusters can be present in addition to or in place of cluster 402. Further, when more than one clusters are present, cluster manager 418 can manage resources for those clusters. In other illustrative examples, one or more additional resource managers may be present to manage resources for those clusters for cluster 402.

Figure 5:
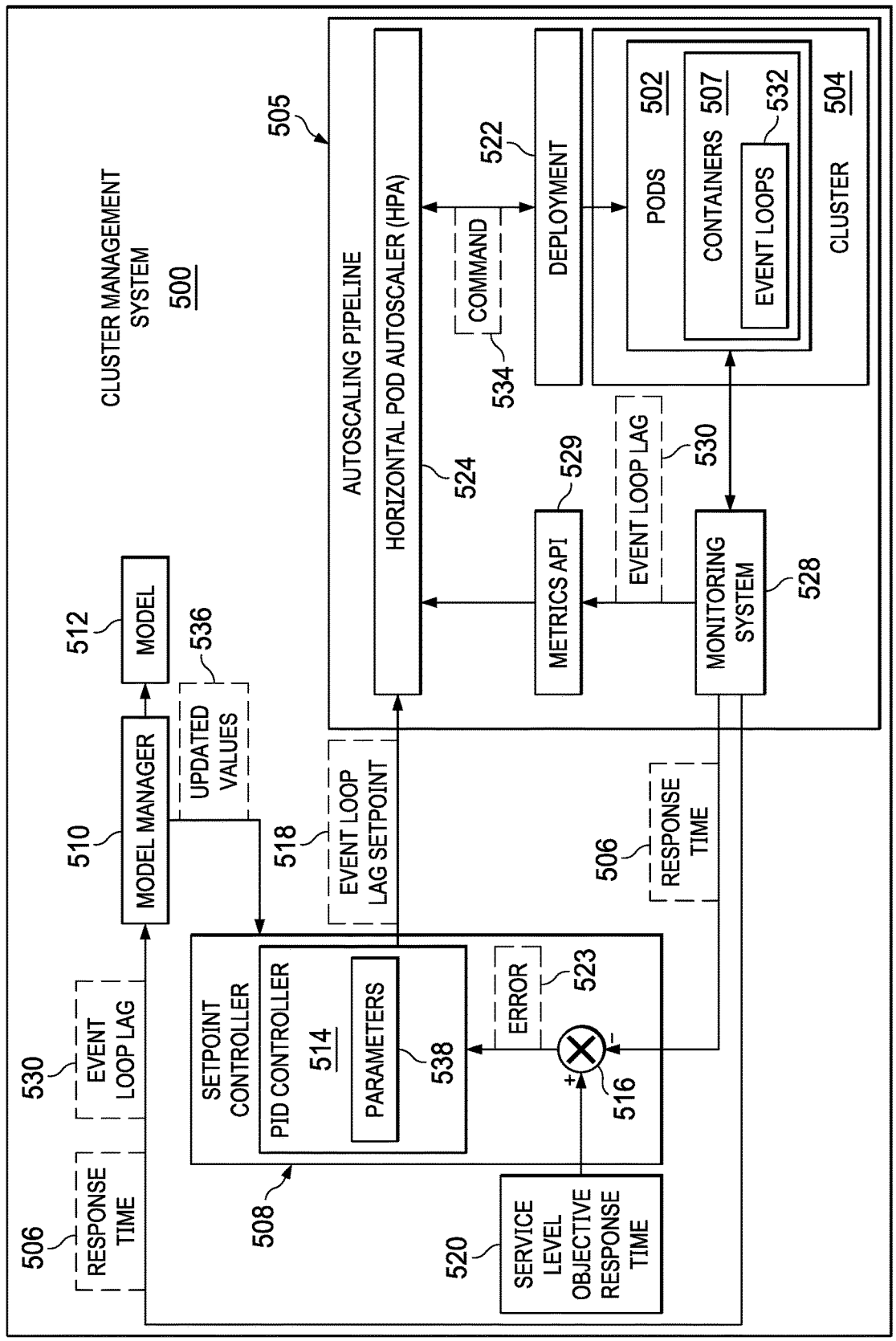
FIG. 5 is an illustration of cluster management system in accordance with an illustrative embodiment.

Turning now to FIG. 5, an illustration of cluster management system is depicted in accordance with an illustrative embodiment. In this illustrative example, cluster management system 500 is an example of an implementation for cluster management system 414 in FIG. 4.

As depicted, cluster management system 500 operates to manage resources in the form of pods 502 in cluster 504 in autoscaling pipeline 505. The scaling of pods 502 is performed to obtain a desired value for response time 506 for services operating in pods 502 in cluster 504.

In this example, cluster management system 500 comprises setpoint controller 508 and model manager 510. Setpoint controller 508 operates to control the scaling of pods 502 in cluster 504. Cluster 504 can change over time. For example, workloads, the number of nodes, memory, storage, or other resources can change. At some point, the change may be such that setpoint controller 508 no longer provides a desired level of control over measured response time 506 for cluster 504. Model manager 510 operates to determine whether cluster 504 has changed where updates are needed to setpoint controller 508.

As depicted, setpoint controller 508 is created using model 512, which is a model of cluster 504. In this example, setpoint controller 508 comprises proportional-integral-derivative (PID) controller 514 and summing point 516. Values for parameters 538 for proportional-integral-derivative (PID) controller 514 are set such that proportional-integral-derivative (PID) controller 514 outputs event loop lag setpoint 518 that is used by horizontal pod autoscaler (HPA) 524 to control deployment 522 to change the number of pods 502 in cluster 504.

In this example, event loop lag setpoint 518 is output by proportional-integral-derivative (PID) controller 514 in response to error 523 between service level objective response time 520 and response time 506. This error is output by summing point 516. Service level objective response time 520 is the desired response time for services running in containers 507 in pods 502 in cluster 504.

Event loop lag setpoint 518 output by proportional-integral-derivative (PID) controller 514 is a value for a corrective action based on a combination of proportional, integral, and derivative terms of the error depending on the transfer function as well as desired adaptation goals.

Event loop lag setpoint 518 is the value of event loop lag that is desired in pods 502. The event loop lag is a control variable that can be used to control response time in cluster 504. In other words, controlling event loop lag results in controlling response time. Event loop lag setpoint 518 is used by horizontal pod autoscaler (HPA) 524 to send instructions or commands to deployment 522, which in turn controls the deployment of pods 502. This deployment includes scaling pods 502 to increase the number of pods 502 or decrease the number of pods 502.

In this example, deployment 526 is a management tool for pods. Although a deployment is described in this example, other illustrative examples may use other types of management tools. For example, a statefulset can also be used, which is a management tool similar to a deployment, but is especially well-suited for stateful applications. Horizontal pod autoscaler (HPA) 524 can send commands or instructions to deployment 526 to scale pods 502.

In this illustrative example, monitoring system 528 can monitor processes in containers 507 in pods 502. For example, monitoring system 528 can monitor metrics such as event loop lag 530 for event loops 532 operating in containers 507. Monitoring system 528 can also be referred to as a metrics server and can identify other metrics in addition to or in place of event loop lag 530. For example, monitoring system 528 can be an event loop utilization, a garbage collection, and other run-time metrics for pods 502. Further, monitoring system 528 can also obtain metrics about the hardware on which pods 502 are running. For example, monitoring system 528 can also obtain information about CPU usage, memory usage, and other metrics about the hardware, such as nodes, in which pods 502 are located.

In this illustrative example, an event loop is an endless loop in a container in which the event loop waits for tasks, asks the tasks and sleeps until more tasks are received. Event loop lag 530 is the period of time between the scheduling of a call back and the execution of the call back for an event loop. In this illustrative example, event loop lag 530 can be measured by monitoring system 528 when containers 507 are instrumented to enable monitoring system 528 to access or receive this metric.

In this example, monitoring system 528 sends event loop lag 530 to horizontal pod autoscaler (HPA) 524 via metrics API 529. As depicted, metrics API 529 can receive calls from monitoring system 528 to send event loop lag 530 to horizontal pod autoscaler (HPA) 524.

In turn, horizontal pod autoscaler (HPA) 524 compares event loop lag 530 with event loop lag setpoint 518. Based on the difference, horizontal pod autoscaler (HPA) 524 can send command 534 to deployment 522 to adjust the number of pods 502 in cluster 504. In this example, monitoring system 528 also sends measures and sends response time 506 to setpoint controller 508 and in particular to summing point 516 in setpoint controller 508. In this illustrative example, the control period evaluating metrics can be 5 seconds, 15 seconds, 1 minute, or some other period of time.

Thus, in this illustrative example, a different metric, such as event loop lag 530, from the metric used to measure a desired level service, such as response time 506. In this particular example, event loop lag 530 is a metric for a control variable used to set setpoint for events loop lag 530 to control the allocation of resources, such as pods 502, in cluster 504. The scaling of pods 502 can be performed to obtain a desired value for a process variable such as a service level indicator in the form of response time 506. Thus, a runtime metric such as event loop lag 530 that is internal to containers 507 in pods 502 can be used to control a metric for the service level indicator (SLI) such as response time 506.

As depicted, monitoring system 528 can be a monitoring system that employs a timeseries database. For example, monitoring system 528 can be implemented using a monitoring system such as Prometheus which provides event monitoring and alerting along with the timeseries database. Prometheus is a free software application used for event monitoring and alerting written in Go and is a project of Cloud Native Computing Foundation (CNCF) along with Kubernetes. Other suitable types of monitoring systems can be used other than Prometheus in other illustrative examples. In this example, horizontal pod autoscaling 524, deployment 522, monitoring system 528, and metrics API 529 can be components found in currently available orchestration systems such as Kubernetes.

In this illustrative example, model manager 510 can receive both response time 506 and event loop lag 530 from monitoring system 528. The values for these parameters can be used to simulate the operation of cluster 504 in autoscaling pipeline 505. This information can be used to determine whether drift occurred in model 512. If drift occurs in model 512, then model manager 510 can generate updated values 536 for parameters 538 in proportional integral derivative (PID) controller 514. In this illustrative example, these updated values 536 can be updated values for being parameters in parameters 538. These updates values 536 for gain parameters in parameters 538 can be based on adaptation goals such as risetime, settling time, overshoot time, or other goals that can be changed during runtime.

The illustration of cluster management system 500 is provided as one illustrative example and not meant to limit the manner in which other illustrative examples can be implemented. Further some components are omitted to avoid obscuring depicting and describing the illustrative example. For example, horizontal pod autoscaler (HPA) 524 depicted as a functional component and shown as a separate component in autoscaling pipeline 505 located outside of cluster 504. In the different illustrative examples, this component can run in a master node within cluster 504. As another example, setpoint controller 508 is also shown as a component located outside of cluster 504. This component can be run on a node within cluster 504 or in another location outside of cluster 504 in different illustrative examples. As yet another example, nodes are present but not shown in cluster 504 on which pods 502 run.

Figure 6:
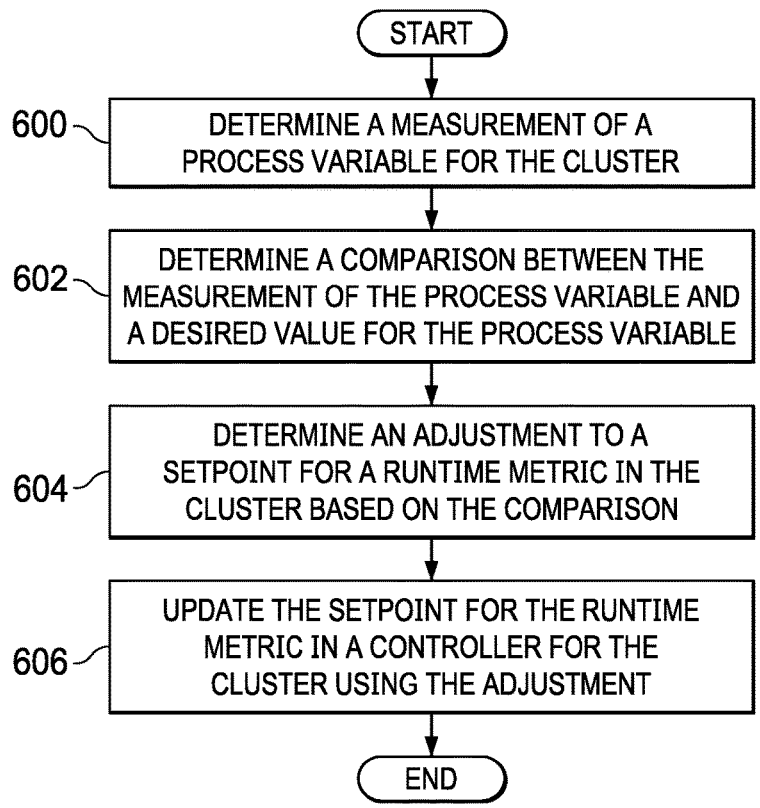
FIG. 6 is a flowchart of a process for managing a cluster in accordance with an illustrative embodiment.

Turning next to FIG. 6, a flowchart of a process for managing a cluster is depicted in accordance with an illustrative embodiment. The process in FIG. 6 can be implemented in hardware, software, or both. When implemented in software, the process can take the form of program instructions that is run by one of more processor units located in one or more hardware devices in one or more computer systems. For example, the process can be implemented in cluster manager 340 in FIG. 3, cluster manager 418 in FIG. 4, and cluster management system 500 in FIG. 5.

The process begins by determining a measurement of a process variable for the cluster (step 600). In step 600, the process variable indicates a quality of service for the cluster.

The process determines a comparison between the measurement of the process variable and a desired value for the process variable (step 602). In this example, step 602 can be performed by determining a difference between the measurement of the process variable and the desired value for the process variable to form an error.

The process determines an adjustment to a setpoint for a runtime metric in the cluster based on the comparison, (step 604). In step 604, the runtime metric is a control variable for the cluster. In one illustrative example, this step can be implemented by determining the adjustment to the runtime metric based on a proportional term, an integral term, and a derivative term in a three term controller.

The process updates the setpoint for the runtime metric in a controller for the cluster using the adjustment (step 606). The process terminates thereafter. In step 606, the runtime metric can be used by the controller as the control variable to scale a set of resources in the cluster to cause a value of the runtime metric to move towards the setpoint.

Figure 7:
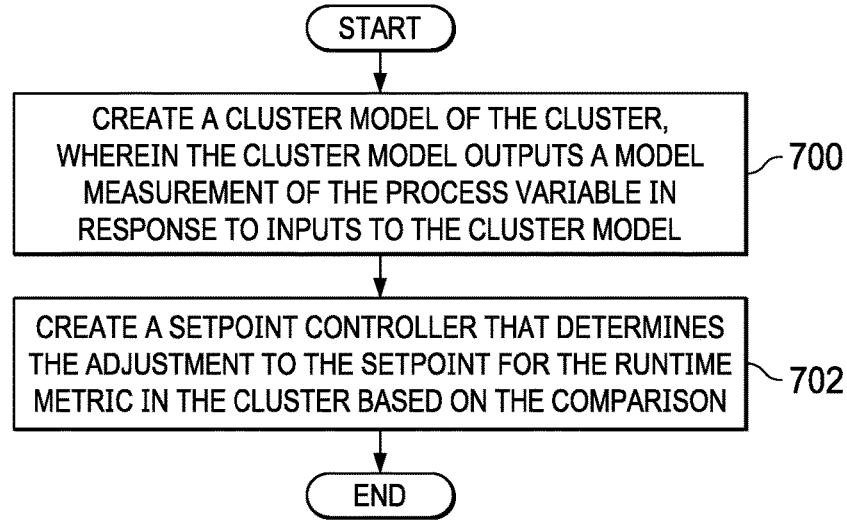
FIG. 7 is a flowchart of a process for creating a setpoint controller is depicted in accordance with an illustrative embodiment.

With reference to FIG. 7, a flowchart of a process for creating a setpoint controller is depicted in accordance with an illustrative embodiment. The steps in the flowchart in FIG. 7 are examples of additional steps that can be performed with the steps in FIG. 6.

The process creates a cluster model of the cluster, wherein the cluster model outputs a model measurement of the process variable in response to inputs to the cluster model (step 700). The process creates a setpoint controller that determines the adjustment to the setpoint for the runtime metric in the cluster based on the comparison (step 702). The process terminates thereafter. In step 702, the runtime metric is the control variable for the cluster and updates the setpoint for the runtime metric in the controller for the cluster.

Figure 8:
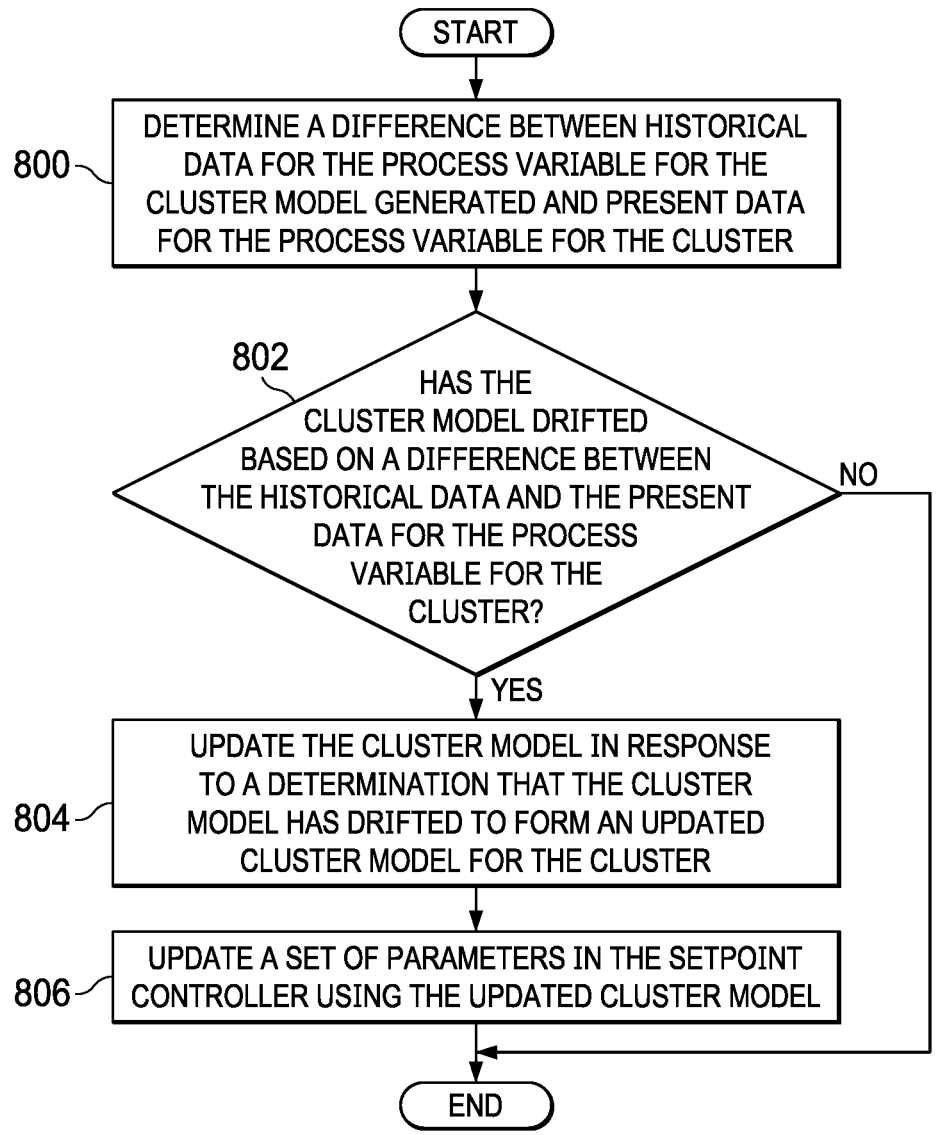
FIG. 8 is a flowchart of a process for updating a set point controller is depicted in accordance with an illustrative embodiment.

With reference next to FIG. 8, a flowchart of a process for updating a set point controller is depicted in accordance with an illustrative embodiment. The steps in the flowchart in FIG. 8 are examples of additional steps that can be performed with the steps in FIG. 6.

The process determines a difference between historical data for the process variable for the cluster model generated and present data for the process variable for the cluster (step 800). The process determines whether the cluster model has drifted based on a difference between the historical data and the present data for the process variable for the cluster (step 802).

The process updates the cluster model in response to a determination that the cluster model has drifted to form an updated cluster model for the cluster (step 804). The process updates a set of parameters in the setpoint controller using the updated cluster model (step 806). The process terminates thereafter.

With reference again to step 802), the process terminates in response to a determination that the cluster model has not drifted.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 9:
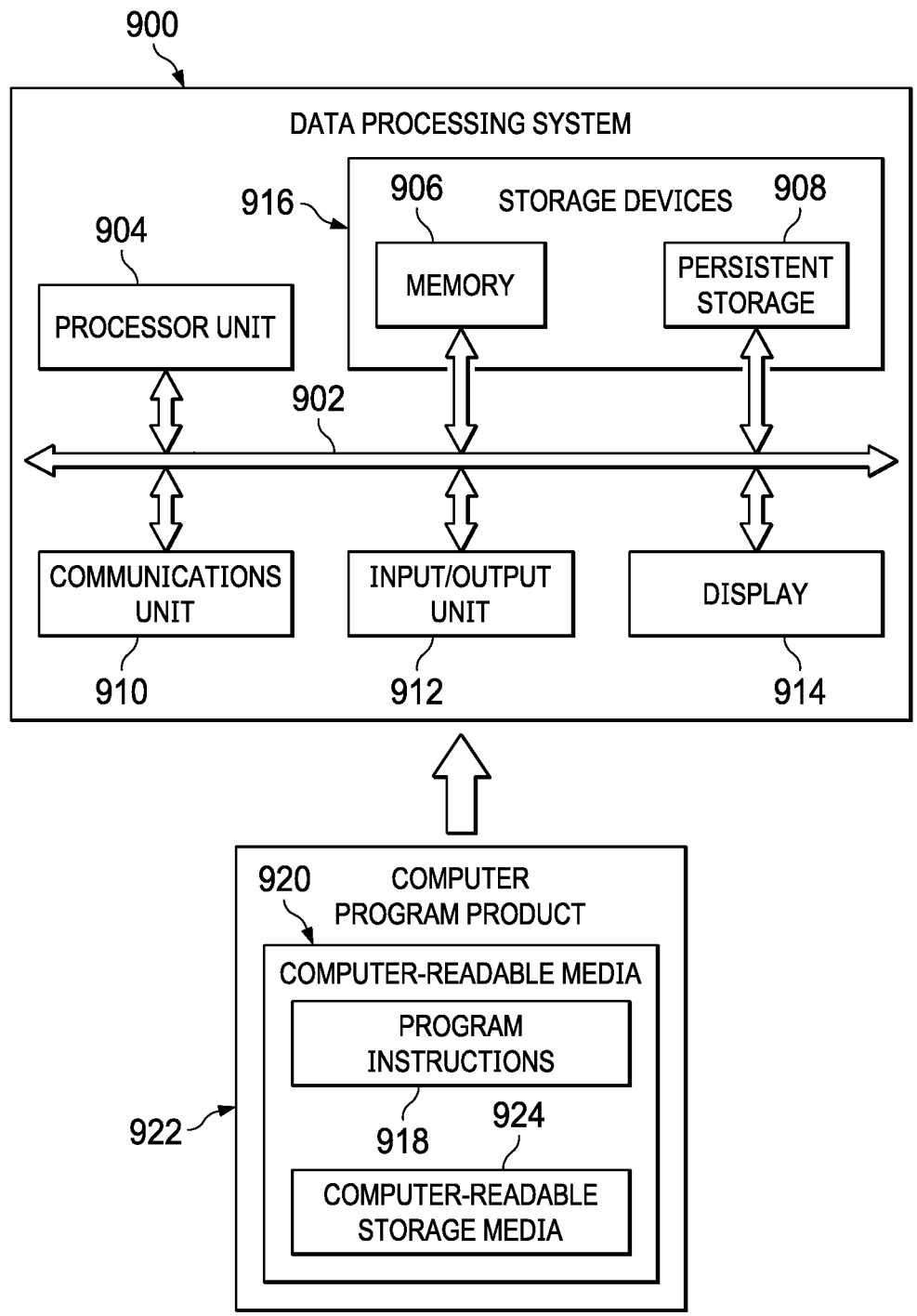
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 304, server computer 306, client devices 310, in FIG. 3. Data processing system 900 can be used to implement cloud computing nodes 110 in FIG. 1, such as personal digital assistant (PDA) or smart phone 120A, desktop computer 120B, laptop computer 120C, and/or automobile computer system 120D in FIG. 1. Data processing system 900 can be used to implement computers in hardware and software layer 202 in FIG. 2 as well as server computer 304, server computer 306, and client devices 310 in FIG. 3. Data processing system 900 can also be used to implement computer system 416 in FIG. 4. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 904 can may be implemented using one or more heterogeneous processor systems in which a main processor is present with secondary processors on a single chip. As another illustrative example, processor unit 904 can be a symmetric multiprocessor system containing multiple processors of the same type on a single chip.

Memory 906 and persistent storage 908 are examples of storage devices 916. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program instructions, computer usable program instructions, or computer-readable program instructions that can be read and executed by a processor in processor unit 904. The program instructions in the different embodiments can be embodied on different physical or computer-readable storage media, such as memory 906 or persistent storage 908.

Program instructions 918 is located in a functional form on computer-readable media 920 that is selectively removable and can be loaded onto or transferred to data processing system 900 for execution by processor unit 904. Program instructions 918 and computer-readable media 920 form computer program product 922 in these illustrative examples. In the illustrative example, computer-readable media 920 is computer-readable storage media 924.

Computer-readable storage media 924 is a physical or tangible storage device used to store program instructions 918 rather than a medium that propagates or transmits program instructions 918. Computer readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 918 can be transferred to data processing system 900 using a computer-readable signal media. The computer-readable signal media are signals and can be, for example, a propagated data signal containing program instructions 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 920" can be singular or plural. For example, program instructions 918 can be located in computer-readable media 920 in the form of a single storage device or system. In another example, program instructions 918 can be located in computer-readable media 920 that is distributed in multiple data processing systems. In other words, some instructions in program instructions 918 can be located in one data processing system while other instructions in program instructions 918 can be located in another data processing system. For example, a portion of program instructions 918 can be located in computer-readable media 920 in a server computer while another portion of program instructions 918 can be located in computer-readable media 920 located in a set of client computers.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program instructions 918.

Thus, illustrative embodiments of the present invention provide a computer implemented method, computer system, and computer program product for managing resources in a cluster. A computer system determines a measurement of a process variable for the cluster, wherein the process variable indicates a quality of service for the cluster. The computer system determines a comparison between the measurement of the process variable and a desired value for the process variable. The computer system determines an adjustment to a setpoint for a runtime metric in the cluster based on the comparison, wherein the runtime metric is a control variable for the cluster. The computer system updates the setpoint for the runtime metric in a controller for the cluster using the adjustment, wherein the runtime metric is used by the controller as the control variable to scale a set of resources in the cluster to cause a value of the runtime metric to move towards the setpoint. According to other illustrative embodiments, a computer system and a computer program product for managing a cluster are provided.

One or more illustrative examples recognize and take into account that other types of metrics can be valuable in meeting a service level objective. In one or more illustrative examples, scaling resources such as pods in a cluster using a metric for processes running in containers in pods can be more useful than current metrics for scaling. For example, runtime metrics such as those metrics that are internal container metrics based on processes running the container can be useful in meeting a service level objective. In other words, the illustrative examples can be used with environments in which metrics are present for running containers that lack components in the operating system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing a cluster, the computer implemented method comprising:

determining, by a computer system, a measurement of a process variable for the cluster, wherein the process variable indicates a quality of service for the cluster;

determining, by the computer system, a comparison between the measurement of the process variable and a desired value for the process variable;

determining, by the computer system, an adjustment to a setpoint for a runtime metric in the cluster based on the comparison, wherein the runtime metric is a control variable for the cluster, and wherein the runtime metric is one of an event loop lag, an event loop utilization, and a garbage collection; and updating, by the computer system, the setpoint for the runtime metric in a controller for the cluster using the adjustment, wherein the runtime metric is used by the controller as the control variable to scale a set of resources in the cluster to cause a value of the runtime metric to move towards the setpoint.

2. The computer implemented method of claim 1 further comprising:

creating, by the computer system, a cluster model of the cluster, wherein the cluster model outputs a model measurement of the process variable in response to inputs to the cluster model; and creating, by the computer system, a setpoint controller that determines the adjustment to the setpoint for the runtime metric in the cluster based on the comparison, wherein the runtime metric is the control variable for the cluster and updates the setpoint for the runtime metric in the controller for the cluster.

3. The computer implemented method of claim 2 further comprising:

determining, by the computer system, a difference between historical data for the process variable for the cluster and present data for the process variable for the cluster; and determining, by the computer system, whether the cluster model has drifted based on the difference between the historical data for the process variable for the cluster and present data for the process variable for the cluster; and updating, by the computer system, the cluster model in response to a determination that the cluster model has drifted to form an updated cluster model for the cluster.

4. The computer implemented method of claim 3 further comprising:

updating, by the computer system, a set of parameters in the setpoint controller using the updated cluster model.

5. The computer implemented method of claim 1, wherein determining, by the computer system, the comparison between the measurement of the process variable and the desired value for the process variable comprises:

determining, by the computer system, a difference between the measurement of the process variable and the desired value for the process variable to form an error;

wherein determining, by the computer system, the adjustment to the setpoint for the runtime metric for the cluster based on the comparison comprises:

determining, by the computer system, the adjustment to the runtime metric based on a proportional term, an integral term, and a derivative term in a three term controller.

6. The computer implemented method of claim 1, wherein the set of resources is selected from at least one of a pod, a container, a persistent volume, a job, or a ConfigMap object.

7. The computer implemented method of claim 1, wherein the process variable is one of a service level indicator, a response time, a latency, an availability, an error rate, a throughput, and a durability.

8. A computer system comprising:

a number of storage devices that store program instructions; and a number of processor units in communication with the number of storage devices, wherein the number of processor units executes program instructions to:

determine a measurement of a process variable for a cluster, wherein the process variable indicates a quality of service for the cluster;

determine a comparison between the measurement of the process variable and a desired value for the process variable;

determine an adjustment to a setpoint for a runtime metric in the cluster based on the comparison, wherein the runtime metric is a control variable for the cluster, and wherein the runtime metric is one of an event loop lag, an event loop utilization, and a garbage collection; and update the setpoint for the runtime metric in a controller for the cluster using the adjustment, wherein the runtime metric is used by the controller as the control variable to scale a set of resources in the cluster to cause a value of the runtime metric to move towards the setpoint.

9. The computer system of claim 8, wherein the number of processor units executes program instructions to:

create a cluster model of the cluster, wherein the cluster model outputs a model measurement of the process variable in response to inputs to the cluster model; and create a setpoint controller that determines the adjustment to the setpoint for the runtime metric in the cluster based on the comparison, wherein the runtime metric is the control variable for the cluster and updates the setpoint for the runtime metric in the controller for the cluster.

10. The computer system of claim 9, wherein the number of processor units executes program instructions to:

determine a difference between historical data for the process variable for the cluster and present data for the process variable for the cluster; and determine whether the cluster model has drifted based on the difference between the historical data for the process variable for the cluster and the present data for the process variable for the cluster; and update the cluster model in response to a determination that the cluster model has drifted to form an updated cluster model for the cluster.

11. The computer system of claim 10, wherein the number of processor units executes program instructions to:

update a set of parameters in the setpoint controller using the updated cluster model.

12. The computer system of claim 8, wherein in comparing the measurement of the process variable with the desired value for the process variable to form the comparison, the number of processor units executes program instructions to:

determine a difference between the measurement of the process variable and the desired value for the process variable to form an error wherein in determining the adjustment to the setpoint for the runtime metric for the cluster based on the comparison, the number of processor units executes program instructions to:

determine the adjustment to the runtime metric based on a proportional term, an integral term, and a derivative term in a three term controller.

13. The computer system of claim 8, wherein the set of resources is selected from at least one of a pod, a container, a persistent volume, a job, or a ConfigMap object.

14. The computer system of claim 8, wherein the process variable is one of a service level indicator, a response time, a latency, an availability, an error rate, a throughput, and a durability.

15. A computer program product for managing a cluster, the computer program product comprising a computer readable storage medium having program instructions embodied therewith, the program instructions executable by a computer system to cause the computer system to perform a method of:
- determining a measurement of a process variable for the cluster, wherein the process variable indicates a quality of service for the cluster;
- determining a comparison between the measurement of the process variable and a desired value for the process variable;
- determining an adjustment to a setpoint for a runtime metric in the cluster based on the comparison, wherein the runtime metric is a control variable for the cluster, and wherein the runtime metric is one of an event loop lag, an event loop utilization, and a garbage collection; and
- updating the setpoint for the runtime metric in a controller for the cluster using the adjustment, wherein the runtime metric is used by the controller as the control variable to scale a set of resources in the cluster to cause a value of the runtime metric to move towards the setpoint.

16. The computer program product of claim 15 further comprising:
- creating a cluster model of the cluster, wherein the cluster model outputs a model measurement of the process variable in response to inputs to the cluster model; and
- creating a setpoint controller that determines the adjustment to the setpoint for the runtime metric in the cluster based on the comparison, wherein the runtime metric is the control variable for the cluster and updates the setpoint for the runtime metric in the controller for the cluster.

17. The computer program product of claim 16 further comprising:
- determining a difference between historical data for the process variable for the cluster and present data for the process variable for the cluster; and
- determining whether the cluster model has drifted based on the difference between the historical data for the process variable for the cluster and the present data for the process variable for the cluster; and
- updating the cluster model in response to a determination that the cluster model has drifted to form an updated cluster model for the cluster.

18. The computer program product of claim 17 further comprising:
- updating a set of parameters in the setpoint controller using the updated cluster model.

\* \* \* \* \*